(12) United States Patent
Kvålseth et al.

(10) Patent No.: US 10,781,799 B2
(45) Date of Patent: Sep. 22, 2020

(54) SYSTEM, METHOD, AND APPARATUS FOR INSTALLING AND OPERATING A LINEAR ACTUATOR

(71) Applicant: Eaton Cummins Automated Transmission Technologies, LLC, Galesburg, MI (US)

(72) Inventors: Andreas Ljosland Kvålseth, Notodden (NO); Bjørn Iversen, Kongsberg (NO); Daniel Norheim, Kongsberg (NO); Henrik Haugum, Kongsberg (NO); Paal Foyn, Kongsberg (NO)

(73) Assignee: Eaton Cmmins Automated Transmission Technologies, LLC, Galesburg, MI (US)

( * ) Notice: Subject to any disclaimer, the term of this patent is extended or adjusted under 35 U.S.C. 154(b) by 33 days.

(21) Appl. No.: 16/047,034

(22) Filed: Jul. 27, 2018

(65) Prior Publication Data

US 2019/0032642 A1    Jan. 31, 2019

Related U.S. Application Data

(60) Provisional application No. 62/537,834, filed on Jul. 27, 2017.

(51) Int. Cl.
*F02G 1/00* (2006.01)
*F03G 1/10* (2006.01)
*F16H 21/44* (2006.01)

(52) U.S. Cl.
CPC ............... *F03G 1/10* (2013.01); *F16H 21/44* (2013.01)

(58) Field of Classification Search
CPC ........... F03G 1/10; F16H 21/44; F16D 25/083
See application file for complete search history.

(56) References Cited

U.S. PATENT DOCUMENTS

| 2,911,961 | A | * | 11/1959 | McRae | F01P 7/046 |
| | | | | | 74/38 |
| 6,234,290 | B1 | * | 5/2001 | Drexl | B60K 23/02 |
| | | | | | 192/85.51 |
| 9,291,215 | B2 | * | 3/2016 | Veit | F16D 25/08 |
| 2016/0322751 | A1 | * | 11/2016 | Van Swearingen | |
| | | | | | H01R 13/642 |
| 2019/0040919 | A1 | * | 2/2019 | Brudeli | F16D 25/083 |

* cited by examiner

*Primary Examiner* — Victor L Macarthur
(74) *Attorney, Agent, or Firm* — Harness, Dickey & Pierce, P.L.C.

(57) ABSTRACT

An actuator, comprising an actuation member positionable into a first retracted position and a second extended position, and a retaining member structured to maintain the actuation member in the first retracted position, and to selectively release the actuation member from the first retracted position in response to an extension force.

9 Claims, 2 Drawing Sheets

US 10,781,799 B2

SYSTEM, METHOD, AND APPARATUS FOR INSTALLING AND OPERATING A LINEAR ACTUATOR

This application claims the benefit of priority of provisional patent application U.S. 62/537,834, filed Jul. 27, 2017, which is incorporated by reference.

FIELD

This disclosure is related to installation and operation of a linear actuator.

BACKGROUND

Presently known systems installing and operating linear actuators suffer from a number of drawbacks. Linear actuators include an extended member moving linearly. The linear member provides a larger device footprint for the actuator in the extended position than in the retracted position. Certain actuators only enforce the linear member in a single direction, for example relying upon other aspects of the installed system to bias the actuator back to the retracted position. Accordingly, linear actuators can suffer from difficulty in installation, service, or the like, where the linear member can extend during installation causing interference or other difficulty.

SUMMARY

The methods and devices disclosed herein overcome the above disadvantages and improves the art by way of an actuator comprising an actuation member positionable into a first retracted position and a second extended position, and a retaining member structured to maintain the actuation member in the first retracted position, and to selectively release the actuation member from the first retracted position in response to an extension force.

A method can comprise positioning an actuation member at a first retracted position, thereby engaging a retaining member to maintain the actuation member in the first retracted position. An actuator including the actuation member can be installed into an assembly, the assembly including an interfering portion that is constructed to interact with the actuation member in a second extended position. The actuation member can be released from the first retracted position after the installing.

Another method can comprise positioning an actuation member at a first retracted position, thereby engaging a retaining member to maintain the actuation member in the first retracted position. An actuator including the actuation member can be removed from an assembly, the assembly including an interfering portion that would interact with the actuation member in a second extended position.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DISCLOSURE

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

Figure 1:
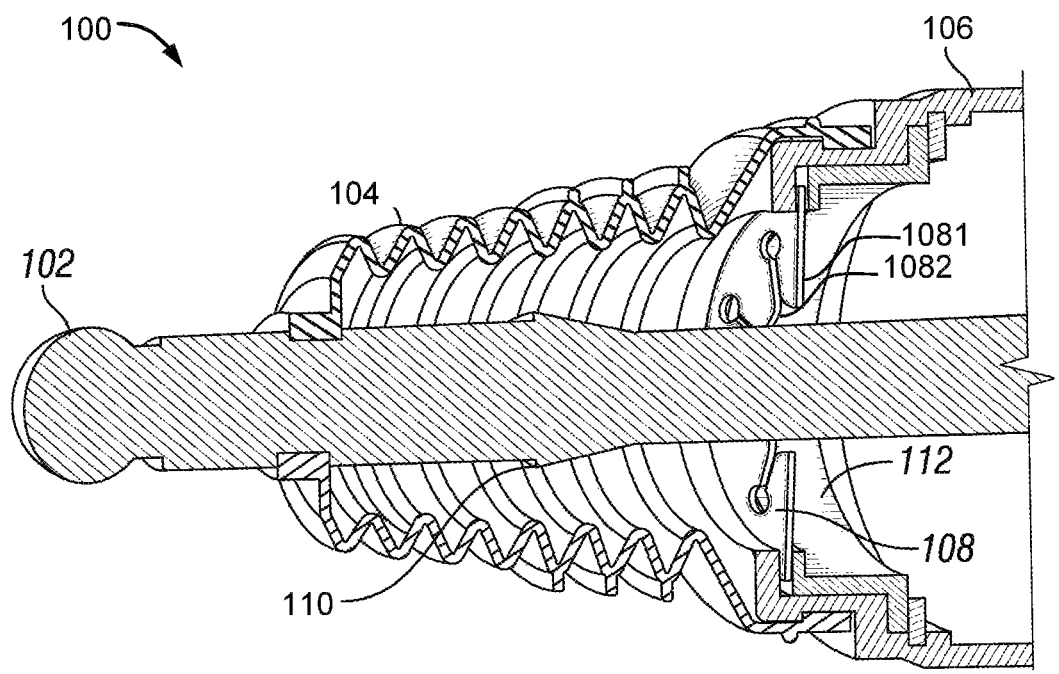
FIG. 1 is a view of an actuator portion comprising an actuation member in an extended position.

Referencing FIG. 1, an example actuator portion 100 is depicted. The actuator portion 100 includes an actuation member 102, which is a push rod for a linear actuator in the example of FIG. 1. Any actuation member 102 having a first retracted position and a second extended position, where the overall physical space occupied by the actuator is increased in the second extended position relative the first retracted position is contemplated herein. In certain embodiments, the actuation member 102 is a linear member of the actuator, although the actuation member 102 may be curved and/or actuate in a curved path. Additionally or alternatively, actuation member 102, in certain embodiments, may rotate, pivot, or move in some other fashion than linear between the first retracted position and the second extended position.

The actuation member 102 in the example of FIG. 1 is depicted in the second extended position. In certain embodiments, the second extended position includes any position extended relative to the first retracted position, and can include a range of positions that, taken together, make up the second extended position. In certain embodiments, the second extended position includes any position wherein the actuation member 102 has a larger overall physical space than is desired for installation, service, or other purposes. During operations of the actuator, in certain embodiments, the actuation member 102 may operate such that an operational retracted position is nevertheless as extended as, or more extended than, the second extended position for the present disclosure. For example, referencing FIG. 1, the second extended position illustrated for the actuation member 102 may be less extended than the actuation member 102 experiences during operation of the actuator.

The example actuator portion 100 further includes a flexible boot 104, for example to provide environmental protection to the interior of the actuator. The flexible boot 104 is depicted to provide a particular context for the actuator portion 100, and is optional. The actuator portion 100 further includes an actuator housing 106, wherein portions of the actuation member 102 traverse through the actuator housing as the actuation member 102 travels through its actuating range. The actuator housing 106 may be shaped in any manner to accommodate the actuation member 102 and/or any other desired aspects of the actuator (e.g., motors, sensors, bosses, coupling devices, etc.) and is depicted to provide a particular context for the actuator portion 100.

The example actuator portion 100 further includes a retaining member 108, where the retaining member holds the actuation member 102 in the first retracted position, and/or limits movement of the actuation member 102 such that the actuation member does not travel to a greater extent than the first retracted position. The example retaining member 108 is provided as a sun spring that engages a projected portion 110 of the actuation member 102. The retaining member 108 engages the actuation member 102 when it is positioned into the first retracted position, and releases the actuation member 102 when an extension force is applied to the actuation member 102 to overcome the engagement force of the retaining member 108. In certain embodiments, the retaining member 108 provides an engagement force that is greater than an extension force that is likely to occur during installation, service, and/or other operations, but lower than an extension force applicable when the actuator is expected to be in service.

Example and non-limiting engagement forces for the retaining member 108 include a force greater than a force of gravity applied by the actuation member 102 (e.g. the weight of the actuation member 102 if the actuator is tilted), a force greater than a force exerted during the installation or service (e.g., if an operation of the installation or service involves an object tending to snag on or tug the actuation member 102, and/or if a relevant volume in the system is pressurized for a test or the like that would tend to urge the actuation member 102 away from the first retracted position). Example and non-limiting engagement forces for the retaining member 108 include a force less than a nominal actuating force exerted by the actuator during operations, a force less than a maximum operating force exerted by the actuator during operations, and/or a force less than an intended disengagement force (e.g., where a procedure of an installation and/or service event includes actively pulling or forcing the actuation member 102 from the first retracted position, the intended disengagement force would be the force expected from such operations).

The example retaining member 108 is depicted as a sun spring engaging a full azimuthal extent of the actuation member 102. The sun spring can comprise an elastically deformable sheet material comprising fingers 1081 spaced around a central opening 1082. The central opening 1082 can be sized and shaped so that a reciprocating arm portion 1022 of the actuation member 102 can reciprocate therethrough. The reciprocation of the reciprocating arm portion 1022 can be without interference. A spring force, or holding force for the fingers 1081 can be designed by the number and spacing of the fingers 1081 and by the extent of the spaces between the fingers 1081. Additionally or alternatively, the retaining member 108 may be a detent, spring clip, or other retaining member. The retaining member further may engage only selected portions of the actuation member 102, distributed either azimuthally, or in a single location.

The example projected portion 110 is a ridge extending around the full circumference of the actuation member 102. Additionally or alternatively, the projected portion 110 may include one or more bumps, tabs, and/or ridges constructed to engage the retaining member 108.

The example actuator portion 100 includes a securing device 112 that secures the retaining member 108 at the selected position. An example securing device 112 includes a press-fit ring that opposes an actuator housing offset 114 to secure the retaining member 108. The provided securing device 112 is a non-limiting example, and any device that secures the retaining member 108 into the selected position is contemplated herein. In certain embodiments, retaining member 108 is self-securing, for example by engaging a detent, ridge, or other feature in the actuator housing 106, secured by an adhesive, and/or secured as an integral portion of the actuator housing 106.

Figure 2:
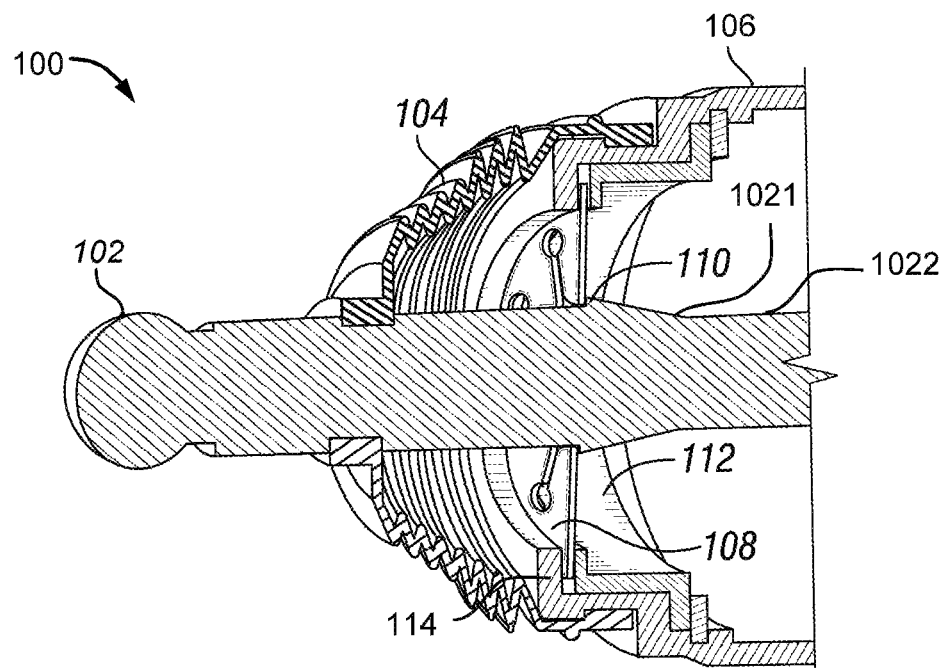
FIG. 2 is a view of an actuator portion comprising an actuation member in a retracted position.

Referencing FIG. 2, the example actuator portion 100 is depicted in the first retracted position. In the example of FIG. 2, projected portion 110 is engaged with the retaining member 108, which prevents the actuation member 102 from extending. Accordingly, installation, service, or other operations can be performed with the actuation member 102 in the first retracted position. Upon application of a force overcoming the securing force by the retaining member 108, for example upon a first actuation by the actuator during operation or post-installation testing, actuation member 102 extends through the retaining member 108 and operates normally thereafter. In certain embodiments, the retaining member 108 flexes and/or deforms when the actuation member 102 extends away from the first retracted position. In certain embodiments, the retaining member 108 is deformed in an elastic deformation, allowing for re-positioning of the actuation member 102 to the first retracted position at a later time (e.g. during a service event) and still be secured by the retaining member 108. In certain embodiments, the retaining member 108 is deformed plastically, and/or is otherwise deactivated from engagement with the actuation member 102, whereupon the actuation member 102 can be returned to a position consistent with the first retracted position without receiving interference from the retaining member 108. For example, where normal operations of actuator provide for an actuation range of the actuation member 102 through the first retracted position, it may be desirable that the retaining member 108 is no longer present after moving the actuation member 102 from the first retracted position to the second extended position. In another example, where the actuator may be a serviceable part and/or a part that will be replaced periodically, it may be desirable that the retaining member 108 remain in position and able to engage the actuation member 102 over the life of the actuator.

Figure 3:
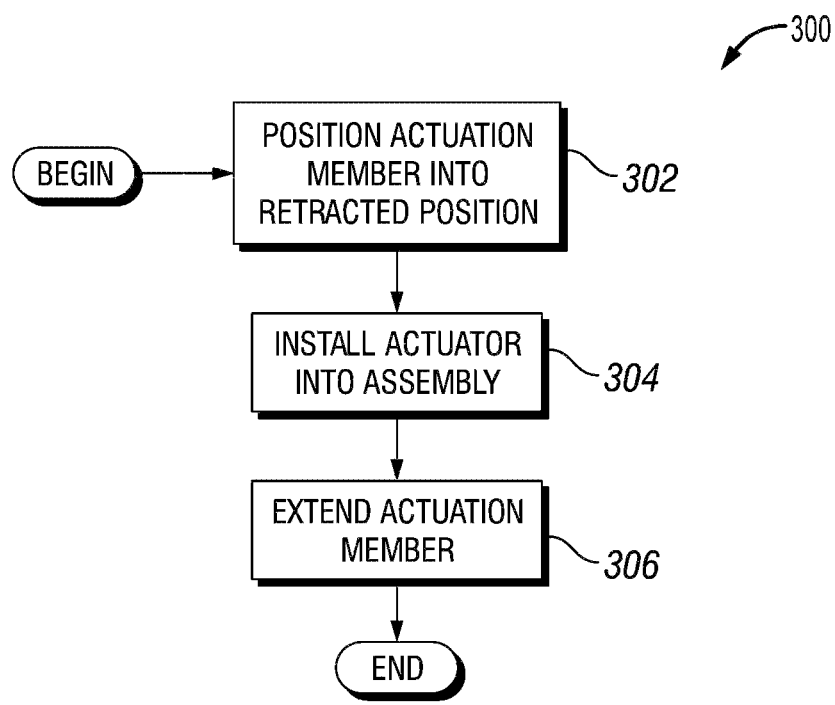
FIGS. 3 & 4 are flow diagrams for methods of using an actuation member.

Referencing FIG. 3, a schematic flow diagram of an example procedure 300 to install a linear actuator is depicted. Procedure 300 includes an operation 302 to position an actuation member into a first retracted position, thereby engaging the actuation member 102 with a retaining member 108. This can comprise engaging projected portion against retaining member 108, as by catching the projected portion 110 against the fingers of the retaining member 108. Procedure 300 further includes an operation 304 to install the linear actuator into an assembly, where the assembly has an interfering portion that would interact with the actuation member if the actuation member was in a second extended position. Example and non-limiting interfering portions include a housing portion, an overhang, and/or a bore or hole into which the actuation member extends during operation but that the actuation member cannot engage throughout the installation in an extended position (e.g. due to a range of angles the linear actuator progresses through during installation). The actuation member 102 is shown with a ball joint at its extrema, and such ball joint can interfere with a socket of an interfering portion. Procedure 300 further includes an operation 306 to extend the actuator from the first retracted position, for example by performing an actuation of the actuation member. The projected portion 110 would push past the fingers of the retaining member 108. A neck-down 1021 can be included on the actuation member 102 to reduce the diameter of the actuation member in an area adjacent the projected portion 110. As illustrated, the neck-down can be a smooth taper to a reciprocating arm portion 1022 so that when the projected portion 110 is optionally re-engaged with the retaining member, the fingers of the retaining member can slide along the tapered portion for a smooth transition. The neck-down can also serve to assist with step 306 for extending the actuation member smoothly, as by providing a smooth transition area for elastic deformation of the fingers 1081. Elastically deforming the retaining member 108 can comprise elastically deforming the fingers 1081 along a neck-down 1021 of the actuation member 102 and seating the fingers 1081 against the projected portion 110. The reciprocating arm portion 1022 can optionally be configured in size and shape to avoid elastic deformation of the fingers 1081 for interference-free reciprocation of the reciprocating arm portion 1022 during use of the linear actuator 100. Releasing the actuation member 102 from the first retracted position can comprise extending the actuation member 102 to the second extended position and interacting the interfering portion with the actuation member 102.

Figure 4:
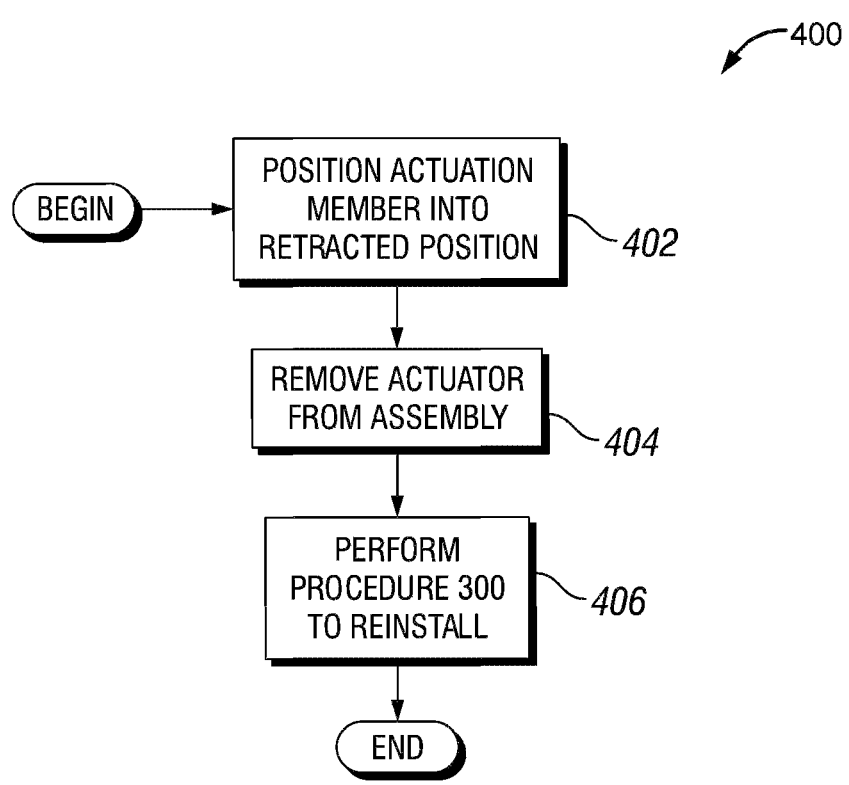

Referencing FIG. 4, a schematic flow diagram of an example procedure 400 to service a linear actuator is depicted. Procedure 400 includes an operation 402 to position an actuation member 102, installed within an assembly, into a first retracted position. This step can comprise pushing the projected portion 110 through the retaining member 108 to catch the projected portion 110 against the retaining member 108. When using a sun spring, as illustrated, this can comprise elastic deformation of the fingers 1081 across the neck-down 1021, passing the neck-down 1021 through the retaining member 108, and exerting a retaining spring force by the retaining member 108 against the projected portion 110. Procedure 400 optionally further includes an operation 404 to remove the linear actuator from the assembly, where the assembly has an interfering portion that would interact with the actuation member if the actuation member was in a second extended position. Example procedure 400 further includes an operation 406 to perform a procedure 300 to reinstall an actuator into the assembly, which may be the same actuator or a replacement actuator. Steps 404 and 406 can optionally be replaced or supplemented with steps to service or replace the interfering portion associated with the linear actuator while the linear actuator is in the retracted position.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

Other implementations will be apparent to those skilled in the art from consideration of the specification and practice of the examples disclosed herein.

What is claimed is:

1. An actuator, comprising:
    an actuation member positionable into a first retracted position and a second extended position; and
    a sun spring having a plurality of radially inwardly extending fingers all generally disposed within a plane, the radially inwardly extending fingers defining a central opening azimuthally surrounding the actuation member, the sun spring engaging the actuation member to maintain the actuation member in the first retracted position, and to selectively release the actuation member from the first retracted position in response to an extension force.

2. The actuator of claim 1, wherein the actuation member comprises a push rod for a linear actuator.

3. The actuator of claim 1, wherein the actuation member comprises a projected portion constructed to engage the sun spring.

4. The actuator of claim 3, wherein the actuation member comprises a reciprocating arm portion, wherein the radially inwardly extending fingers engage against the projected portion when the actuation member is positioned in the first retracted position, and wherein the radially inwardly extending fingers surround the reciprocating arm portion when the actuation member is in the second extended position.

5. The actuator of claim 4, wherein the actuation member further comprises a neck-down between the projected portion and the reciprocating arm portion, and wherein the radially inwardly extending fingers are constructed to elastically deform along the neck-down when transitioning the actuation member between the first retracted position and the second extended position.

6. The actuator of claim 3, wherein the actuation member comprises a circumference, and wherein the projected portion comprises a ridge extending around the circumference.

7. The actuator of claim 3, wherein the projected portion comprises one or more of bumps, tabs, or ridges constructed to engage the radially inwardly extending fingers.

8. The actuator of claim 1, wherein the extension force comprises a force not greater than a nominal actuating force for an actuator including the actuation member.

9. The actuator of claim 1, further comprising an actuator housing, an actuator housing offset, and a securing device that opposes the actuator housing offset to secure the sun spring.

* * * * *

UNITED STATES PATENT AND TRADEMARK OFFICE
CERTIFICATE OF CORRECTION

PATENT NO. : 10,781,799 B2
APPLICATION NO. : 16/047034
DATED : September 22, 2020
INVENTOR(S) : Andreas Ljosland Kvalseth et al.

Page 1 of 1

It is certified that error appears in the above-identified patent and that said Letters Patent is hereby corrected as shown below:

On the Title Page

Column 1, Item (73) Assignee, Line number 1, delete "Cmmins" and insert --Cummins--

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*